US008881122B1

(12) United States Patent
Klimek et al.

(10) Patent No.: US 8,881,122 B1
(45) Date of Patent: Nov. 4, 2014

(54) PREDICATE MATCHING LIBRARY FOR COMPLEX PROGRAM ANALYSIS

(75) Inventors: Manuel Klimek, Munich (DE);
Zhanyong Wan, Kirkland, WA (US);
Bruce Chandler Carruth, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 272 days.

(21) Appl. No.: 13/316,432

(22) Filed: Dec. 9, 2011

(51) Int. Cl.
*G06F 9/45* (2006.01)

(52) U.S. Cl.
USPC .......................................... 717/144; 717/140

(58) Field of Classification Search
USPC ........................................................ 717/144
See application file for complete search history.

(56) References Cited

U.S. PATENT DOCUMENTS

| 5,259,766 | A * | 11/1993 | Sack et al. .................... | 434/362 |
| 7,000,213 | B2 * | 2/2006 | Banerjee et al. .............. | 716/103 |
| 2004/0205050 | A1 * | 10/2004 | Stevens et al. .................... | 707/3 |
| 2005/0050391 | A1 | 3/2005 | Grieskamp et al. ............. | 714/25 |
| 2007/0277163 | A1 * | 11/2007 | Avresky ......................... | 717/140 |
| 2009/0254876 | A1 * | 10/2009 | Kuriakose et al. ............ | 717/105 |
| 2009/0276757 | A1 * | 11/2009 | Lindvall et al. ............... | 717/121 |
| 2011/0320431 | A1 * | 12/2011 | Jackson et al. ................ | 707/713 |

OTHER PUBLICATIONS

Aho et al. "Code Generation Using Tree Matching and Dynamic Programming", ACM 1989, retrieved from <http://site.iugaza.edu.ps/hzaq/files/2010/02/Code_generation_using_tree_matching_and_dynamic_programming,.pdf>, total pp. 26.*
Gosling J., "Ace: a syntax-driven C preprocessor," Sun Microsystems, Inc. Jul. 1989, pp. 1-11.
LIP6, "What is Coccinelle?" Jan. 4, 2012, 2 pages, [online] [retrieved on May 31, 2012] Retrieved from the Internet <URL:http://coccinelle.lip6.fr/>.
Sourceforge.net, "XPath Rule tutorial," PMD, Jan. 31, 2012, 4 pages, [online] [retrieved on May 31, 2012] Retrieved from the Internet <URL:http://pmd.sourceforge.net/xpathruletutorial.html>.

* cited by examiner

*Primary Examiner* — Don Wong
*Assistant Examiner* — Marina Lee
(74) *Attorney, Agent, or Firm* — Birch, Stewart, Kolasch & Birch, LLP (57) ABSTRACT

A matching library of a code analysis system defines a number of predicates applicable to an abstract syntax tree (AST) corresponding to program code being analyzed. The predicates represent whether or not nodes of the program code's AST have corresponding properties, such as representing a class that inherits from another given class. The code analysis system obtains an AST to analyze, a predicate expression query that includes predicates of the matching library, and action code. The code analysis system identifies nodes of the AST that match the predicate expression query by executing code of the matching library and executes the action code against the identified nodes.

27 Claims, 4 Drawing Sheets

PREDICATE MATCHING LIBRARY FOR COMPLEX PROGRAM ANALYSIS

NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field of Art

The present invention generally relates to the field of digital information processing, and more specifically, to analyzing and modifying computer programs.

2. Background of the Invention

Computer programmers often wish to be able to identify portions of a computer program with given properties and to take actions on the identified portions. For example, a programmer might be interested in identifying classes having certain names and inheritance relationships, such as all classes having names starting with the letter 'c' that are second-level children (i.e., children of children) of classes with a given name. As another example, a programmer might be interested in identifying and modifying code for refactoring purposes, such as changing a method with signature "ClassA::GetWidget(int)" to accept two arguments instead of one, and thus to have the signature "ClassA::GetWidget(int, int)." In this example, in order to avoid breaking calling code it is important to change not only the signature of the method in its declaration, but also to appropriately change all code that also calls the method, a non-trivial operation.

The properties of interest can become very complex, particularly in the case of complex languages such as C++ that support features such as object oriented programming, multiple inheritance, friend functions, class and function templates, and so forth. For example, it can be difficult to distinguish non-member declarations within the body of a class, such as "friend void f(int)," from true member declarations such as "virtual void f(int a)." It is even more difficult to distinguish the properties of the function solely from the code used to call it, such as "f(3)," without further analysis of the context in which it is called. Similarly, when refactoring calls to ClassA::GetWidget(int) to accept two parameters rather than one, the presence of another class, ClassB, with a similar method GetWidget with the signature ClassB::GetWidget (int) would cause calls to a method "obj.GetWidget(3)" to be ambiguous without the additional context of the type of the object "obj".

Further, for certain properties of interest, such as the inheritance relationships of different classes, the portions of code at issue (e.g., different classes) may be located far apart within a given code file, or may be in entirely different code files, rather than being localized for easy analysis. Thus, lexical analysis techniques that merely analyze the text of the program code are usually awkward to apply, and in many cases entirely incapable of identifying particular code of interest.

SUMMARY

In one embodiment, a computer-implemented method comprises storing a matching library comprising code for matching a plurality of predicates in a procedural programming language against nodes of an abstract syntax tree (AST). The method further comprises obtaining an input AST corresponding to computer program code to analyze and obtaining analysis code comprising a predicate expression query referencing the matching library and action code performing an action with respect to the computer program code, wherein the computer program code, the predicate expression query, and the action code are specified in the procedural programming language. The method further comprises identifying nodes of the input AST that match the predicate expression query by executing code of the matching library, executing the action code against the identified nodes of the input AST that match the predicate expression query, and outputting a result of the execution of the action code.

In one embodiment, a computer-readable storage medium stores executable computer program instructions, comprising instructions for accessing a matching library comprising code for matching a plurality of predicates in a procedural programming language against nodes of an abstract syntax tree (AST). The instructions further comprise instructions for obtaining an input AST corresponding to computer program code to analyze and instructions for obtaining analysis code comprising a predicate expression query referencing the matching library and action code performing an action with respect to the computer program code, wherein the computer program code, the predicate expression query, and the action code are specified in the procedural programming language. The instructions further comprise instructions for identifying nodes of the input AST that match the predicate expression query by executing code of the matching library, instructions for executing the action code against the identified nodes of the input AST that match the predicate expression query, and instructions for outputting a result of the execution of the action code.

In one embodiment, a computer system comprises a computer processor and a computer-readable storage medium storing a matching library comprising code for matching a plurality of predicates in a procedural programming language against nodes of an abstract syntax tree (AST). The computer-readable storage medium further has executable computer program instructions embodied therein that when executed by the computer processor perform actions comprising obtaining an input AST corresponding to computer program code to analyze, obtaining analysis code comprising a predicate expression query referencing the matching library and action code performing an action with respect to the computer program code, wherein the computer program code, the predicate expression query, and the action code are specified in the procedural programming language, executing the action code against the identified nodes of the input AST that match the predicate expression query, and outputting a result of the execution of the action code.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1A:
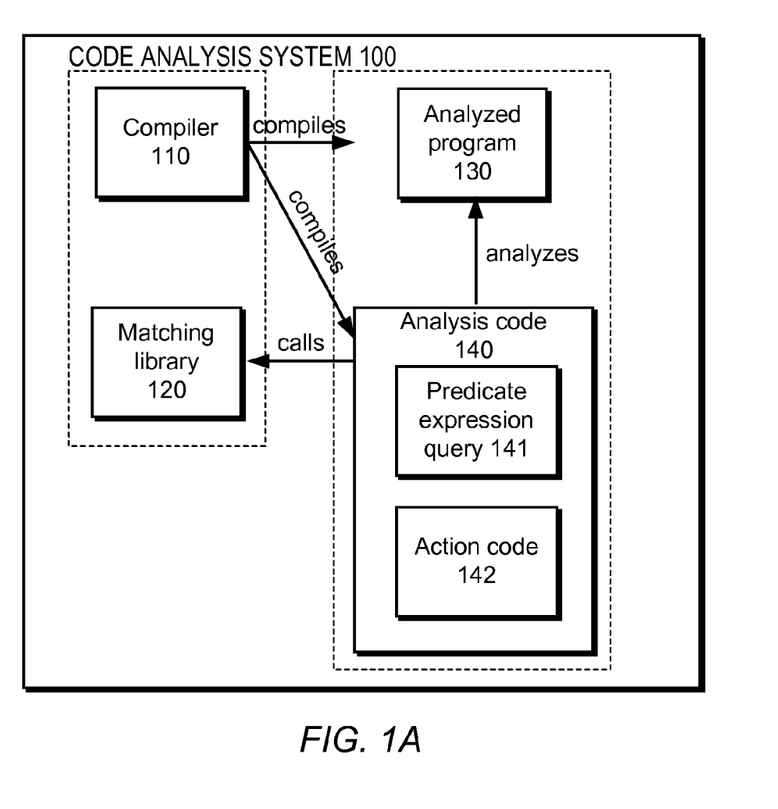
FIG. 1A is a high-level block diagram illustrating components of a code analysis system, according to one embodiment.

FIG. 1 is a high-level block diagram illustrating components of a code analysis system 100, according to one embodiment. The code analysis system 100 represents any computer system on which code for computer programs can be compiled and executed. The code analysis system 100 comprises modules including a compiler 110 for a procedural programming language and a matching library 120 implementing a set of predicates corresponding to various properties of code in the procedural programming language. The code analysis system 100 further comprises a program 130 to be analyzed, and analysis code 140 for analyzing the program. These components are now described in further detail.

The compiler module 110 is a compiler for a particular procedural programming language, such as C, C++, Java, C#, or the like. The compiler 110 takes as input one or more files containing code in the procedural programming language and produces as output compiled program instructions, such as native machine instructions, bytecode interpreted by a virtual machine, or the like. Examples of the compiler 110 include GNU's GCC or MICROSOFT'S VISUAL C++ for languages such as C and C++, and ORACLE'S JAVAC for JAVA.

The program 130 represents the source code for the program to be analyzed. The program 130 is written in one of the languages supported by the compiler 110. For example, if the compiler 110 is GCC (which supports C++), the program 130 could be written in C++. The program 130 can consist of a single file of source code. Alternatively, the program 130 may be arbitrarily complex, comprising any number of distinct source code files and calling any number of external libraries, for example.

The program 130 can be represented by an abstract syntax tree (AST). The AST is a tree representation of the abstract syntactic structure of the source code for the program, and can be produced by the compiler 110 or by a separate tool. For example, consider the following listing of C++ code:

Example 1

```
1   class MyCustomType {
2   public:
3     MyCustomType( );
4     MyCustomType(int x) { /* ... */ }
5     MyCustomType(MyCustomType begin, MyCustomType end);
6     // ...
7   };
8
9   void test(int i, int j) {
10    MyCustomType variable1( ),
11      variable2 (MyCustomType(i), MyCustomType(j)),
12      variable3 (MyCustomType( ), MyCustomType( )),
13      variable4 (MyCustomType(i), variable1( ));
14    MyCustomType (&variable5 (MyCustomType(i),
```

-continued

Example 1

```
15      MyCustomType(j))) [42];
16    MyCustomType(variable2(variable1 ( ), variable1 ( )));
17  }
```

A simplified version of an AST for the code portion "test(int, int)" starting at line 9 might be expressed in tabular form as follows.

TABLE 1

```
1   (CompoundStmt
2     (DeclStmt
3       "MyCustomType (variable1) ( )"
4       "MyCustomType (variable2) (MyCustomType, MyCustomType)"
5       "MyCustomType (variable3) (MyCustomType (*) ( ),
          MyCustomType (*) ( ))"
6       "MyCustomType variable4 =
7         (CXXConstructExpr 'class MyCustomType' 'void (class
            MyCustomType, class MyCustomType)'
8           (CXXConstructExpr 'class MyCustomType' 'void (const
              class MyCustomType &) throw( )'
9             (CXXFunctionalCastExpr 'class MyCustomType'
                functional cast to class MyCustomType
                <ConstructorConversion>
10              (CXXConstructExpr 'class MyCustomType' 'void
                  (int)'
11                (DeclRefExpr 'int' lvalue ParmVar 'i'
                    'int'))))))))
12          (CXXConstructExpr 'class MyCustomType' 'void (const
              class MyCustomType &) throw( )'
13            (CallExpr 'class MyCustomType'
14              (DeclRefExpr 'class MyCustomType (void)'
                  lvalue Function 'variable1' 'class
                  MyCustomType (void)'))))))))"
15    (DeclStmt
16      "MyCustomType (&(variable5) (MyCustomType,
          MyCustomType)) [42]")
17      (CXXFunctionalCastExpr 'class MyCustomType' functional
          cast to class MyCustomType <ConstructorConversion>
18        (CXXConstructExpr 'class MyCustomType' 'void (const
            class MyCustomType &) throw( )' elidable
19          (CallExpr 'class MyCustomType'
            ...
```

Each entry in the second column represents a node of the AST, each node representing a semantic element into which a program can be decomposed, such as a compound statement, an assignment statement, a variable declaration, a function call, a function or class definition, and the like. For example, entry 1 represents a node corresponding to a compound statement ("CompoundStmt")—namely, the block comprising the three statements beginning at lines 10, 14, and 16 of Example 1, respectively. Each entry contains information about the node, including its semantics (e.g., "CompoundStmt").

An AST node need not correspond to a specific portion of the code; rather, certain AST nodes are created implicitly based on the context of the code and the rules of the procedural programming language in question, without any explicit code. For example, entry 8 is a node representing a call to the C++ copy constructor to copy the first argument of line 14 into the first parameter of the constructor defined on line 5. The call to the copy constructor is not explicit, but rather is implicit based on the rules of C++.

Indentation of table entries indicates the parent-child relationships of the nodes corresponding to the entries. For example, entry 2 is indented with respect to entry 1 and hence is a child node of the node for entry 1. Likewise, entry 10 is a child node for the node of entry 9. Entries 8 and 12 are both at the same level of indentation (namely, one additional level of indentation with respect to element 7) and hence are both child nodes of the node for element 7. As with all trees, there is exactly one path between the nodes for any pair of entries: from one of the nodes, up the tree as depicted by the various levels of indentation until a common ancestor is reached, and then down the tree to the other node. For example, the path between the nodes for entries 9 and 14 proceeds from entry 9 up to "ancestor" entry 7, and then down from entry 7 to entry 14.

The AST of Table 1 expresses, for example, that lines 10-12 and 14 of the code represent function declarations (see AST, lines 2-5 and 15-16, listing "DeclStmt" entries); that line 13 of the code is a variable declaration (see AST, lines 6-14, listing a "DeclStmt" entry with further "CXXConstructorExpr" sub-entries); and that line 16 of the code is an expression (see AST, lines 17 onward, listing a "CXXFunctionalCastExpr" rather than a "DeclStmt"). Although the AST provides more contextual information than the program code alone, it is still difficult to analyze when identifying portions of code that have certain properties of interest.

Figure 1B:
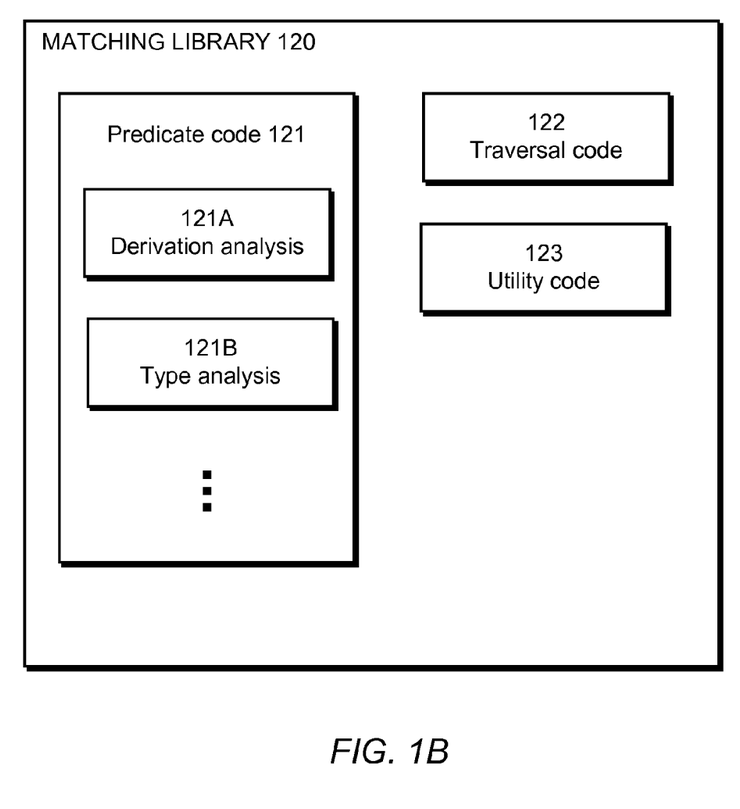
FIG. 1B is a block diagram illustrating sub-components of the matching library of FIG. 1A.

The matching library module 120 comprises predicate code 121 that implements the matching of a set of predicates against an AST, each predicate corresponding to a property of code in the procedural programming language compiled by the compiler 110. A predicate is said to be satisfied if there are nodes in the AST that have the property corresponding to the predicate. For example, for a language such as C++, predicates of interest include whether a node represents (for example) a call, a callee, a class, a string literal, an arrow, a "for" loop, or a member function; whether the node has any name, or a given name, as indicated by a corresponding portion of the code; whether the node represents a given class or structure; whether the node represents a class that is derived from some other specified class; whether the object type of an expression represented by the node is a given type; whether the object type of a pointer represented by the node is a given type; and the like. A predicate that can also be viewed as producing a list of AST nodes that have the predicate property: an empty list if the predicate is not satisfied, and a non-empty list of nodes having the property if it is satisfied.

The various predicates may accept different numbers of arguments, as appropriate for the predicate in question. For example, in the code listing of Example 2 (below), the Call( ) predicate is depicted as accepting three arguments corresponding to three sub-predicates, and in general may accept any number, each sub-predicate defining the properties of the function or method that is called. Similarly, the Class( ) predicate accepts any number of nested sub-predicates, each representing a property of of class to be matched. A different predicate, such as IsDerivedFrom( ) (described below), might accept only one argument: a class from which derivation is to be evaluated. A predicate that has nested sub-predicates within it is referred to as a "compound predicate," and the outermost predicate not itself contained within any other predicates is referred to as a "top-level predicate." An expression having one or more predicates is referred to as a "predicate expression."

The predicate code may further comprise code implementing other helper functions used a manner similar to predicates, but not matching particular AST. For example, an Id( ) function (defined below) does not match a particular AST node, but rather labels nodes matching a given predicate with a given label, the labels then being able to be referenced as properties when evaluating predicates.

A more complete listing of the various predicates and helper functions provided by one embodiment for analyzing C++ is included herewith as Appendix A.

In one embodiment, the matching library 120 is implemented in (or at least callable from) the same procedural programming language for which the library contains predicates. For example, for a matching library 120 containing predicates applicable to programs written in C++, the matching library itself is implemented using C++. This means that any programmer (hereinafter simply "user") who understands the procedural programming language of the program 130 itself can readily understand and apply the predicates of the matching library 120.

In one embodiment, each predicate is implemented with a function call, the function call creating a predicate matcher object that—when executed—evaluates the condition corresponding to the predicate with respect to an AST. The function call accepts a number of arguments appropriate to the semantics of the predicate. For example, the predicate "IsDerivedFrom" for a language such as C++ could represent whether a first class inherits, directly or indirectly, from a second class specified as an argument to the predicate. Thus, the function call for the predicate "IsDerivedFrom" would take one argument: an indication of the second given class, the first class being implicitly specified as part of the application of the predicate.

For purposes of example, several sample types of predicates of interest for the analysis of an object-oriented procedural programming language such as C++ are now discussed in further detail.

As one example, derivation analysis predicates 121A analyze derivation relationships, such as the inheritance of one class from another, the implementation of an interface, or the like. As one example of a derivation analysis predicate, the predicate IsDerivedFrom(classA) is satisfied when the node currently being matched represents a class (or, e.g., interface) that was derived from the class supplied in the argument, classA. Derivation need not be direct, but rather can involve any number of levels of derivation. For example, if a class named "class1" inherited from a class named "class2", the predicate IsDerivedFrom(Class(HasName("class2"))) would be true for class1. Likewise, if class1 did not inherit directly from class2, but rather were a second-level, or third-level (or, more generally, $n^{th}$-level) subclass, IsDerivedFrom(Class (HasName("class2"))) would still be true for class1. Thus, the number of levels of inheritance separation for such a query need not be statically specified by the user—e.g., via a query of the form "ChildOf( . . . ) OR ChildOf(ChildOf( . . . )) OR ChildOf(ChildOf(ChildOf( . . . )))" searching for first, second, or third-level derivation—but rather is dynamically determined at runtime by the matching library 120. For example, to identify all the subclasses named "MyClass" that are direct or indirect descendants of a class named "MyAncestorClass", a user could specify a query of the general form:

Class(HasName("MyClass"), IsDerivedFrom(Class(HasName("MyAncestorClass")))) where the top-level predicate Class( ) specifies that to match, an AST node must represent a class; the first sub-predicate HasName("MyClass") indicates that the class must be named "MyClass", and the second sub-predicate (IsDerivedFrom) indicates that the class must have the given derivation relationship (i.e., be derived from the class named "MyAncestorClass").

As another example, to identify instances of an inheritance "diamond" (i.e., two classes each singly inheriting from a base class named "Base", and a further class multiply inheriting from both of the two classes), a user could specify a query of the general form:

```
Class( . . . , AllOf(IsDerivedFrom(Id("first",
                Class(IsDerivedFrom(Class(HasName("Base"))))),
                IsDerivedFrom(Class(Not(SameAs("first")),
                IsDerivedFrom(Class(HasName("Base"))))))
```

This matches nodes representing classes that derive from both a first class that in turn derives from class "Base" and a second class that in turn derives from class "Base" but is different from the first class that derives from "Base."

The predicate IsDerivedFrom(classA) can also be extended to specify constraints on the level of derivation. For example, the predicate IsDerivedFrom(classA, min, max) can be used to specify a minimum ("min") and a maximum ("max") degree of derivation between one class and another. That is, the compound predicate IsDerivedFrom(Class(HasName("MyAncestorClass")), 2, 3) will match nodes for classes that are "grandchildren" or "great-grandchildren" of the class named "MyAncestorClass," but will not match nodes for direct child classes or classes more distantly related than great-grandchildren.

In another example, type analysis predicates analyze the types of variables, expressions, and the like. For example, the predicate HasType(typeA) is satisfied when the AST node currently being matched represents an object or other variable having the type of the given argument ("typeA"), which can be a class, a struct, or an interface. Similarly, the predicate PointsTo(typeA) is satisfied when the AST node currently being matched represents a pointer to an object or other variable having the type of the given argument. Thus, to identify all AST nodes corresponding to objects of the class "MyClass", a user could specify the query of the general form:

HasType(Class(HasName("MyClass")))

In another example, the predicate ThisPointerType(typeA) is satisfied when the AST node currently being matched represents a method call of a class, and where the implicit object argument of the call—such as the pointer "this" in C++—has the specified type ("typeA"), or is a pointer to that type. For example, in the following code, the predicate "ThisPointerType(Class(HasName("MyClass")))" is true for the AST node corresponding to the call "timesTwo( )" on line 5, since the implicit "this" calling object of the "timesTwo( )" is of type "MyClass." Since the calling object is implicit, this determination would be exceedingly difficult to make based solely on the text of the source code.

```
01   class MyClass {
02     int timesTwo( ) { return (m_int * 2); }
03
04     void compute( ) {
05       int i = timesTwo( ); //this.timesTwo( ) is implicit
06       ...
07     }
08     private int m_int = 3;
09   }
```

In another example, node type predicates analyze the semantics of a particular node and are satisfied if the node has the a type corresponding to the predicate. For example, the predicates Class, Expression, and For are satisfied if node represents a class, an expression, or a for( ) loop, respectively.

In addition to the code implementing the various predicates, the matching library 120 further comprises tree traversal code 122 for traversing the AST for the analyzed code 130 when identifying matches for the predicates in the query. In one embodiment, matching proceeds by traversing the nodes of the tree, at each node determining a list of predicates that match that node, and terminating once all the predicates have been matched. As a simple example, when matching the compound predicate Class(HasName("class1")), the code of the matching library traverses the AST, identifying nodes that match the predicate Class( ) and those that match the predicate HasName("class1"), and when a node matching both those predicates is found the compound predicate is considered matched. Query matching involves one primary traversal of all the nodes of the AST, corresponding to the top-level predicate. However, certain sub-predicates may require further traversal of the tree. For example, predicates that analyze the relationships of different elements of the AST—such as the predicate "HasDescendant( )", which examines descendant classes of a given class—require additional traversals. To reduce the amount of required computation, a caching scheme (memoization) may be employed for each node to avoid performing matching more than once per node.

In some embodiments, the matching library 120 further comprises utility code 123 that can be called by a user when taking actions in response to identified matches. For example, the matching library 120 can provide functions for enumerating the determined matches and listing their properties, for reporting matches, for refactoring the program code 130 based on the matches (e.g., renaming elements, or adding or removing parameters from functions), and the like.

An example of a matching library 120 for C++ is provided herewith as Appendices B and C. Appendix B represents a header file containing the declarations of certain classes, methods, and functions used in the matching, and Appendix C represents an implementation file providing implementation for the declarations of the header file.

In one embodiment, the analysis code 140 for analyzing the program 130 is written in the same procedural programming language as the program itself, thus allowing (for example) a developer of the program 130 to analyze and operate on the code in an intuitive manner. Conceptually, the analysis code 140 can include both a predicate expression query 141—an expression having a nested set of predicates that specify the conditions to be matched—and action code 142 taking an action in response to query matches. As noted, the predicates used in the query—such as Class( ) HasName( ) or IsDerivedFrom( )—are defined by the matching library 120.

As one example, in an embodiment in which the procedural programming language is C++, analysis code 140 to identify calls to a given method name where the calling object has a given type can be specified by the following query:

Example 2

```
01   tooling::RefactoringTool Tool(argc 3, argv + 3);
02   tooling::MatchFinder Finder;
03   Finder.AddMatcher (
04     Call (
05       Callee (Method (HasName (MethodName))),
06       Callee (Id ("callee", MemberExpression( ))),
07       ThisPointerType (Class (HasName (ClassName)))),
08     new RenameMethod(&Tool.GetReplacements( ), MethodName,
09       ReplacementName));
10   return Tool.Run(Finder.NewFrontendActionFactory( ));
```

In the above C++ code of Example 2, the Finder object created in line 2 is used to match given queries against the AST of the program 130. The call to its AddMatcher( ) method in line 3 specifies a query 141 to match:

```
Call(
    Callee(Method(HasName(MethodName))),
    Callee(Id("callee", MemberExpression( ))),
    ThisPointerType(Class(HasName(ClassName)))
)
```

This query 141 matches a call to a specified method of a specified class. The properties of the query are specified using predicates of the matching library 120. The predicates may be nested within each other to more specifically define subproperties of a given predicate and may be separated with commas to specify a conjunction of multiple required predicate properties.

In Example 2, a function call corresponding to the "Call" predicate is used at line 4 to create a predicate matcher object for matching an AST node representing a method or function call. In order to further define the properties of the call, function calls for the nested predicate "Callee" are specified on line 5 and on line 6, and a function call for the nested predicate "ThisPointerType" is specified on line 7, thereby creating corresponding predicate matcher objects for matching these predicates. The function call to the "Callee" predicate on line 5 further makes a function call to the predicate "Method", which in turn makes a function call to the predicate "HasName" with the argument "MethodName." Thus, line 5 specifies that the called code should more specifically be a method of a class and should have the name specified by the string variable "MethodName." Line 6 results in binding a node satisfying the Callee predicate (i.e., a node for a member expression) to the given label "callee" in the match result when the predicate matches. Other predicates could then take the label into account, though this is not illustrated in this particular example.

The function call to the "ThisPointerType" predicate on line 7 makes a function call to the "Class" predicate, which in turn makes a function call to the "HasName" predicate with the argument "ClassName." Thus, line 7 further specifies that the called method be called via a pointer to an object having the type of a class whose name is specified by the string variable "ClassName." In sum, a predicate expression is formed, representing a composite predicate having one or more predicates with a hierarchical order specified by their nesting arrangement. The function calls corresponding to the predicates create corresponding predicate matcher objects, associated with each other with the same nesting and order as the query 141.

After the predicates defining the query are specified, line 8 specifies an action to be taken when a match is found, via an "OnMatch" object that defines functions to be called in the case of a match. Finally, the matching process is initiated via a call to the "Run" method of a tool object that abstracts the manner in which the code of the analyzed program 130 is stored and read during analysis.

Thus, for example, in the following code sample, the code "prod→addWidget( )" would match the above query, presuming that the value of "MethodName" were "addWidget" and the value of "ClassName" were "Product." This is so because the method call has the specified name (i.e., "addWidget") and because it is called via a pointer to an object of a class with the specified name (i.e., "Product").

Example 3

```
01 Product*prod=new Product( );
02 prod→addWidget ( );
```

In a more realistic example, lines 1 and 2 might not be consecutive, but rather might be separated by large amounts of intervening code, or might be in entirely separate files. For example, the declaration of the object "prod" in line 1 might be in a header file, and the call to "prod→addWidget( )" might take place in a separate file providing the implementations of the header file. Thus, using lexical analysis alone, in such a situation it would be extremely difficult to identify the "addWidget( )" method only of objects of type Product*, given that the declaration of the object takes place at an arbitrary location in a completely different file, and thus its type is not readily ascertainable.

The analysis code 140 need not merely identify matches of the query, but can further include specifying action code 142 corresponding to actions to be taken when a match is found (referred to herein as the "action code"). For example, possible actions include reporting matches (e.g., displaying, printing, or logging the lines and column numbers of source code associated with the matching AST nodes), computing code metrics by counting the occurrences of certain structural patterns (e.g., number of templates, number of template instantiations, number of base classes, number of classes with base classes, or average number of base classes), or altering code associated with the matches, such as modifying the names of functions, classes, or structures, or modifying the number of parameters of a function or method. For example, the following action code for the "RenameMethod" class previously referenced replaces the name of the matching methods with the name specified by the variable "ReplacementMethodName."

Example 4

```
01  virtual void Run(const tooling::MatchFinder::MatchResult
02      &Result) {
03      const MemberExpr *Callee =
04          Result.Nodes.GetStmtAs<MemberExpr>("callee");
05      const std::string CalleeText =
06          GetText(*Result.SourceManager, *Callee);
07      std::string ReplacementText =
08          CalleeText.substr(0, CalleeText.size( ) –
09          MethodName.size( )) + ReplacementName;
10      Replace>insert(Replacement(*Result.SourceManager, Callee,
11          ReplacementText));
```

Specifically, at line 1, the AST nodes corresponding to the matching portion of the code are provided as the "result" parameter to the "Run( )" callback method of the "RenameMethod" class. Lines 2-6 obtain the name of the matching method, and lines 7-11 do a string replacement to alter the name of the method to the value given by the "ReplacementName" string. With the name replaced, further code could then take actions such as outputting a summary of changes to be made, or modifying the original source code files to account for the renaming of the method.

A complete example of analysis code 140 for method renaming is provided herewith as Appendix D.

It is appreciated that the compiler 110, the matching library 120, the analyzed program 130, and the analysis code 140 need not be created by the same individual or organization. For example, one organization might create the compiler 110, a second organization might create the matching library 120, and a third organization might create the analyzed program 130 and the analysis code 140. The analyzed program 130 and the analysis code 140 could also be created by different organizations. In short, although the different units 110-140 interrelate in different ways, such as the analysis code 140 calling the matching library 120, the compiler compiling the analyzed program 130 and in so doing referencing functions of the matching library 120, and the like, there need be no particular authorship relationships between the different units.

Figure 2:
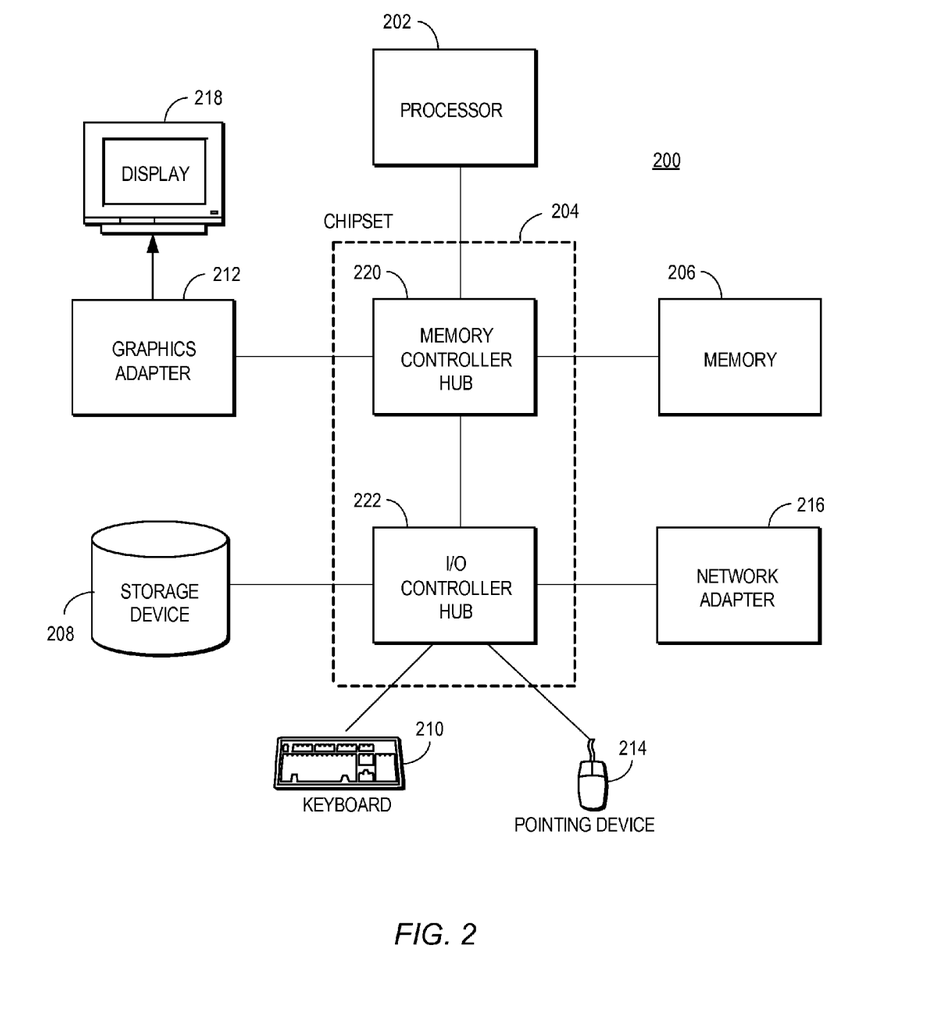
FIG. 2 is a high-level block diagram illustrating physical components of a computer, according to one embodiment.

FIG. 2 is a high-level block diagram illustrating physical components of a computer 200 used as part or all of the code analysis system 100 from FIG. 1, according to one embodiment. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The storage device 208 is any non-transitory computer-readable storage medium, such as a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer 200. The graphics adapter 212 displays images and other information on the display 218. The network adapter 216 couples the computer system 200 to a local or wide area network.

As is known in the art, a computer 200 can have different and/or other components than those shown in FIG. 2. In addition, the computer 200 can lack certain illustrated components. In one embodiment, a computer 200 acting as a server may lack a keyboard 210, pointing device 214, graphics adapter 212, and/or display 218. Moreover, the storage device 208 can be local and/or remote from the computer 200 (such as embodied within a storage area network (SAN)).

As is known in the art, the computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Figure 3:
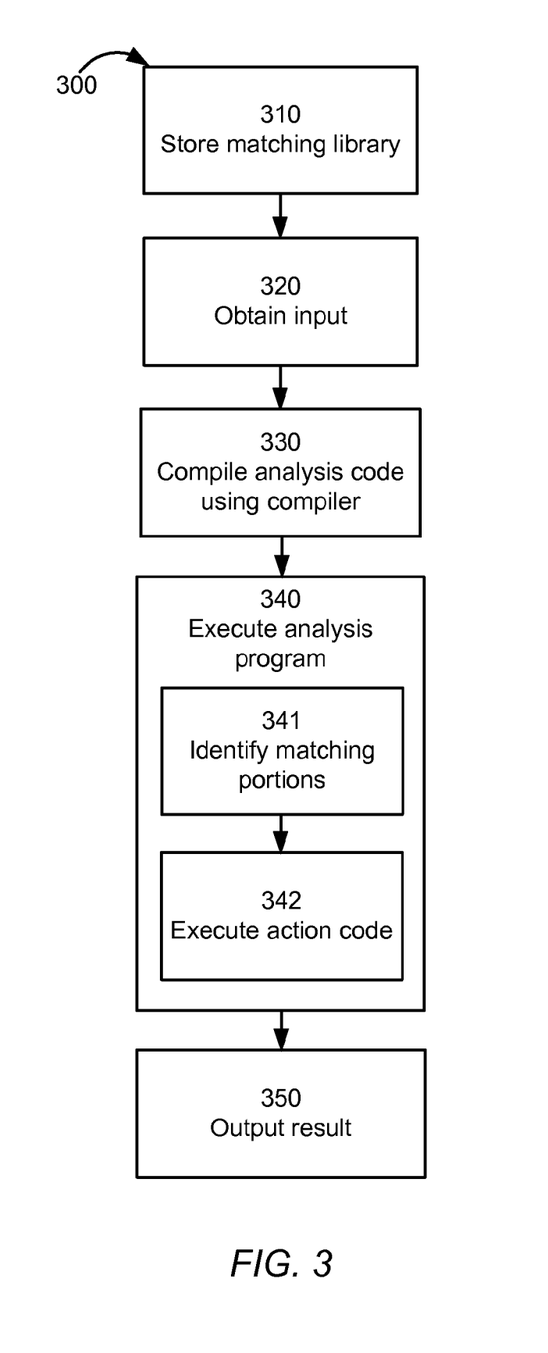
FIG. 3 is a flowchart representing operations performed by the code analysis system when analyzing code, according to one embodiment.

FIG. 3 is a flowchart representing the operations 300 performed by the code analysis system 100 when analyzing code, according to one embodiment.

The code analysis system 100 stores 310 the matching library 120, typically on one the storage devices 208, such as a hard disk. As described above with respect to FIG. 1, the matching library 120 comprises code that implements (at least) predicates and predicate matching functionality.

The code analysis system 100 obtains 320 input for matching that represents the program to analyze and the analysis to perform on that program, such as filenames of corresponding files. Specifically, the input includes indications (e.g., filenames) of the analyzed program 130 (or of a corresponding input AST for it) and the analysis code 140, the latter of which contains a predicate expression query 141 and references the matching library 120. For example, the predicate expression query 141 results in a call to the matching library 120 for each predicate in the query. If the analyzed program 130 is received directly, the code analysis system 100 may transform it to a corresponding AST by executing the compiler or other development tool. Equivalently, instead of receiving the analyzed program 130, the code analysis system 100 may instead directly receive the input AST representing the analyzed program.

The input may be received by reading the analyzed program 130 and the analysis code 140 from specified locations in the file system, such as a storage device 208. In practice, the analysis could be initiated by a user as a target of a makefile or other project compilation system that specifies file paths to (or project descriptions of) the analyzed program 130 and the analysis code 140.

The code analysis system 100 compiles 330 the analysis code 140 into an executable analysis program using the compiler 110. In the case of a language such as C++, the compilation results in a native executable file containing processor-executable machine instructions. The compilation 330 comprises creating the compound predicate serving as the query 141 based on the predicates defined by the matching library 120. For example, consider the following code excerpt from Example 2, above:

```
03  Finder.AddMatcher(
04    Call(
05      Callee(Method(HasName(MethodName))),
06      Callee(Id("callee", MemberExpression( ))),
07      ThisPointerType(Class(HasName(ClassName)))),
08    new RenameMethod(&Tool.GetReplacements( ), MethodName,
09        ReplacementName));
10    return Tool.Run(Finder.NewFrontendActionFactory( ));
```

In response to encountering the code for function calls "Call", "Callee", "Method", "Class", "HasName", and "ThisPointerType", the compiler 110 generates calls to create a set of corresponding predicate matcher objects composited appropriately into the overall compound predicate expression that constitutes the query 141. The compiler 110 further generates code to initiate matching of the predicate matcher objects against the analyzed program 130 in response to encountering the code "Tool.Run . . . )". (Predicate matcher objects are said to match an AST node if their corresponding predicates are satisfied by that node.) As noted, functions such as "Call", "Callee", "Method", "Class", "HasName", and "ThisPointerType", as well as the RenameMethod object, are defined by the matching library 120.

The compilation 330 additionally comprises using the compiler 110 to compile any specified action code 142, such as the method renaming code specified by Example 4, above.

The code analysis system 100 then executes 340 the analysis program that results from the compilation 330. This includes executing the query to identify 341 matching portions of the AST. In one embodiment, executing the query comprises executing the function calls to the predicate functions (e.g., "Call( )", "Method( )", "HasName( )", "Callee( )", "ThisPointerType( )", and the like), which causes the creation and composition of predicate matcher objects that determine whether the various predicates apply to given portions of the AST.

Execution of code such as "Tool.Run( )" from Example 2, above, initiates the matching process. During the matching process, code of the matching library 120 traverses the program's AST, testing the various predicates of the query for matches via their corresponding predicate matcher objects until nodes of the AST matching the entire query—that is, all of its constituent predicates in the given composition order—have been identified. Nodes are said to satisfy a predicate if the values of the nodes cause the corresponding predicate matcher object to match the nodes. Further, nodes are said to match the query 141 as a whole if they match the predicate matching object of the top-level predicate in the query, which entails matching the constituent predicates in the query with the given order and nesting relationships.

Once a match has been identified 341, the code analysis system 100 executes 342 the action code 142 (if any) of the analysis code 140, which takes action in response to the match. For example, the code analysis system 100 could execute the code specified in the "Run( )" method of Example 4, above, which carries out the renaming of methods that match the query.

The code analysis system outputs 350 the result of the identifying 341 and/or the executing 342. The output can be one of different actions depending on user-specified options, or on the action code 342 itself. For example, the output include textually displaying a summary of the matches on a console (e.g., file, line, and column numbers of matches), or to print the summary to a printer, or writing the summary to a log file. As another example, the output can include modifying the code of the analyzed program 130 (e.g., by changing the code text based on refactoring operations such as renaming methods or changing numbers of function parameters, or by creating copies thereof that reflect the modifications).

In short, through use of the matching library 120, a user can quickly and easily author analysis code 140 in the same language as the program 130 being analyzed. This allows the user to draw on his or her existing language-specific knowledge, without being obliged to learn an additional query language for identifying matching portions of the program 130. Further, the analysis code 140 can be compiled by the existing compiler 110, without the need to install additional compilers to handle action code specified in a different programming language. Still further, the use of the predicates specified by the matching library 120 allows the formation of complex queries—such as those analyzing class inheritance relationships—that would be difficult or impossible to analyze solely though lexical analysis of the program code 130.

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for the purpose of example, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the below claims.

What is claimed is:

1. A computer-implemented method comprising:
  storing a matching library comprising code for matching a plurality of predicates in a first procedural programming language against nodes of an abstract syntax tree (AST);
  obtaining an input AST corresponding to computer program code to analyze;

obtaining, from a user, analysis code comprising a predicate expression query referencing the matching library and action code performing an action with respect to the computer program code, wherein the computer program code, the predicate expression query, and the action code are specified in the same first procedural programming language;

identifying nodes of the input AST that match the predicate expression query by executing code of the matching library;

executing the action code against the identified nodes of the input AST that match the predicate expression query; and outputting a result of the execution of the action code.

2. The computer-implemented method of claim 1, wherein the predicate expression query comprises a plurality of the predicates of the matching library, each predicate expressed as a function call in the first procedural programming language to a function that creates a matcher object for the predicate, the matcher object determining whether the predicate is true for given nodes of the input AST.

3. The computer-implemented method of claim 2, wherein at least one of the predicates is nested in at least one other of the predicates, the nested predicate specifying an additional property of the predicate in which it is nested.

4. The computer-implemented method of claim 2, wherein nodes of the input AST match the predicate expression query if each of the plurality of predicates is true for the nodes.

5. The computer-implemented method of claim 1, wherein the plurality of predicates includes a derivation predicate that analyzes inheritance relationships between classes.

6. The computer-implemented method of claim 5, wherein the derivation predicate determines whether given nodes of the input AST correspond to a first class that inherits from a second class supplied as an argument to the derivation predicate.

7. The computer-implemented method of claim 1, wherein the plurality of predicates includes a predicate that determines whether given nodes of the input AST represent a call to an object having a given type.

8. The computer-implemented method of claim 1, wherein the plurality of predicates includes a predicate that determines, for given nodes of the input AST, whether all of the following are true:
the given nodes correspond to a method, the method has an implicit calling object, and the implicit calling object is of a specified type.

9. The computer-implemented method of claim 1, wherein the plurality of predicates includes a node type predicate that determines, for a given node of the input AST, whether the node has a type corresponding to the node type predicate.

10. The computer-implemented method of claim 9, wherein the node type predicate is satisfied if the given node represents a for loop.

11. The computer-implemented method of claim 1, wherein the plurality of predicates includes a predicate that accepts a plurality of sub-predicates and that is satisfied if and only if each of the sub-predicates is satisfied.

12. The computer-implemented method of claim 1, wherein the plurality of predicates includes a predicate that accepts a plurality of sub-predicates and that is satisfied if any of the sub-predicates is satisfied.

13. The computer-implemented method of claim 1, wherein the predicate expression query includes at least one predicate, and wherein the matching library comprises code for associating a label with the at least one predicate of the predicate expression query, such that the label is associated with nodes of the input AST that match the at least one predicate.

14. A computer-readable storage medium storing executable computer program instructions, comprising:
instructions for accessing a matching library comprising code for matching a plurality of predicates in a first procedural programming language against nodes of an abstract syntax tree (AST);
instructions for obtaining an input AST corresponding to computer program code to analyze;
instructions for obtaining, from a user, analysis code comprising a predicate expression query referencing the matching library and action code performing an action with respect to the computer program code, wherein the computer program code, the predicate expression query, and the action code are specified in the same first procedural programming language;
instructions for identifying nodes of the input AST that match the predicate expression query by executing code of the matching library;
instructions for executing the action code against the identified nodes of the input AST that match the predicate expression query; and
instructions for outputting a result of the execution of the action code.

15. The computer-readable storage medium of claim 14, wherein the predicate expression query comprises a plurality of the predicates of the matching library, each predicate expressed as a function call in the first procedural programming language to a function that creates a matcher object for the predicate, the matcher object determining whether the predicate is true for given nodes of the input AST.

16. The computer-readable storage medium of claim 15, wherein at least one of the predicates is nested in at least one other of the predicates, the nested predicate specifying an additional property of the predicate in which it is nested.

17. The computer-readable storage medium of claim 15, wherein nodes of the input AST match the predicate expression query if each of the plurality of predicates is true for the nodes.

18. The computer-readable storage medium of claim 14, wherein the plurality of predicates includes a derivation predicate that analyzes inheritance relationships between classes.

19. The computer-readable storage medium of claim 18, wherein the derivation predicate determines whether given nodes of the input AST correspond to a first class that inherits from a second class supplied as an argument to the derivation predicate.

20. The computer-readable storage medium of claim 14, wherein the plurality of predicates includes a predicate that determines whether given nodes of the input AST represent a call to an object having a given type.

21. A computer system comprising:
a computer processor; and
a computer-readable storage medium storing a matching library comprising code for matching a plurality of predicates in a first procedural programming language against nodes of an abstract syntax tree (AST), the computer-readable storage medium further having executable computer program instructions embodied therein that when executed by the computer processor perform actions comprising:
obtaining an input AST corresponding to computer program code to analyze;

obtaining, from a user, analysis code comprising a predicate expression query referencing the matching library and action code performing an action with respect to the computer program code, wherein the computer program code, the predicate expression query, and the action code are specified in the same first procedural programming language;

identifying nodes of the input AST that match the predicate expression query by executing code of the matching library;

executing the action code against the identified nodes of the input AST that match the predicate expression query; and outputting a result of the execution of the action code.

22. The computer system of claim 21, wherein the predicate expression query comprises a plurality of the predicates of the matching library, each predicate expressed as a function call in the first procedural programming language to a function that creates a matcher object for the predicate, the matcher object determining whether the predicate is true for given nodes of the input AST.

23. The computer system of claim 22, wherein at least one of the predicates is nested in at least one other of the predicates, the nested predicate specifying an additional property of the predicate in which it is nested.

24. The computer system of claim 22, wherein nodes of the input AST match the predicate expression query if each of the plurality of predicates is true for the nodes.

25. The computer system of claim 21, wherein the plurality of predicates includes a derivation predicate that analyzes inheritance relationships between classes.

26. The computer system of claim 25, wherein the derivation predicate determines whether given nodes of the input AST correspond to a first class that inherits from a second class supplied as an argument to the derivation predicate.

27. The computer system of claim 21, wherein the plurality of predicates includes a predicate that determines whether given nodes of the input AST represent a call to an object having a given type.

* * * * *